Sept. 10, 1946.  LE ROY B. HIGH ET AL  2,407,495
METHOD AND APPARATUS FOR FORMING THERMOPLASTIC INNER SOLES
Filed Nov. 24, 1943
FIG. 1.
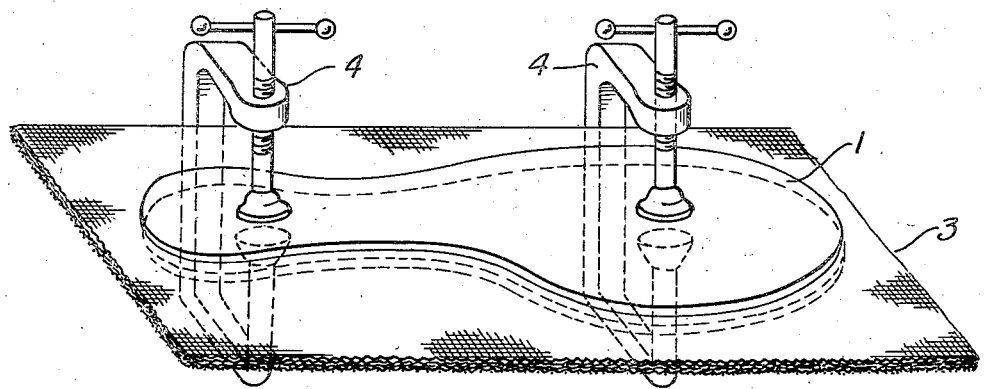
FIG. 2.  FIG. 3.
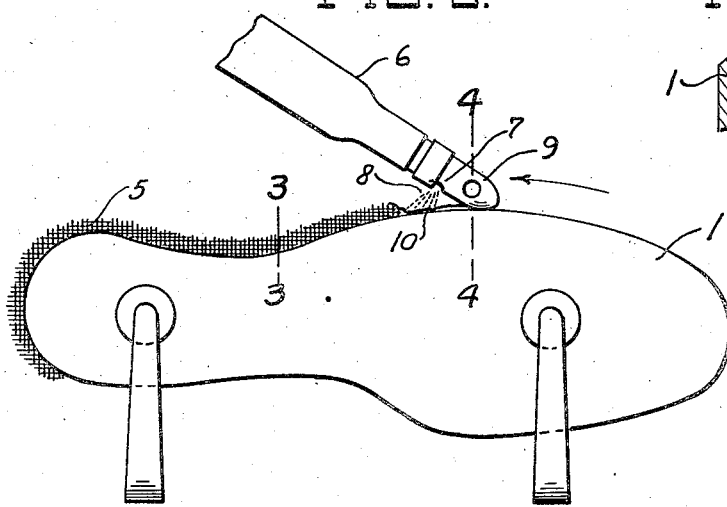 
FIG. 4.
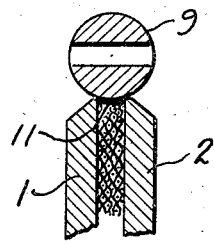
INVENTORS
Gunnar C. T. Lindh
LeRoy B. High
BY
Barnes, Kisselle, Laughlin & Raisch
Attorneys Patented Sept. 10, 1946

2,407,495

UNITED STATES PATENT OFFICE 2,407,495

METHOD AND APPARATUS FOR FORMING THERMOPLASTIC INNER SOLES

Le Roy B. High, and Gunnar C. T. Lindh, Detroit, Mich., assignors to The Udylite Corporation, Detroit, Mich., a corporation of Delaware Application November 24, 1943, Serial No. 511,560

11 Claims. (Cl. 154—42)

This invention relates to a method and apparatus for forming a thermoplastic inner sole.

In hot and humid climates it has been found desirable to provide shoes with porous inner soles which assist in ventilating the feet of the person wearing the shoes. Such ventilation decreases the rate of perspiration of the feet and assists in keeping the feet dry and inhibiting the growth of bacteria and fungi which are the cause of some foot diseases.

It is the object of this invention to produce an inner sole for a shoe from laminated, porous webs of thermoplastic material which is smooth, free from barbs and comfortable on the foot. This object is achieved by welding the laminations together along their edges by means of a hot gaseous blast and a mechanical ironer to form a strong and smooth weld.

Fig. 1 is a perspective showing the laminated sheets clamped between the inner sole templets.

Fig. 2 is a plan view illustrating the welding step.

Figs. 3 and 4 are sections along the lines 3—3 and 4—4 respectively of Fig. 2.

In fabricating the inner sole there is provided a pair of templets 1 and 2 having the contour of the inner sole to be fabricated. A plurality of porous or foraminated sheets or webs 3 of thermoplastic material are placed one upon the other to form a laminated structure. The form of these foraminated sheets is not critical, but preferably the foraminated sheets consist of screening woven from thermoplastic thread. This woven thermoplastic screen is commonly used for screening out insects. The number of sheets 3 of screening can be varied depending upon the type of shoe into which the inner sole is inserted. Four or five plies or sheets of thermoplastic screening will provide an inner sole having a thickness sufficient to provide the requisite ventilation. The thermoplastic screen is also preferably positioned so that the threads of some of the sheets will run diagonally and non-parallel to the threads of some of the other sheets.

A plurality of sheets 3 of foraminated thermoplastic are next clamped between the templets 1 and 2 by clamps 4, the templets 1 and 2 first being accurately aligned so that their peripheries coincide. The templets hold the sheets under pressure and in flat condition. The sheets 3 are cut roughly to size, preferably about the templets 1 and 2 with a small overhang 5 completely around the periphery of the templets. However, the sheets can be cut to a size slightly larger than the templets before being clamped between the same. This overhanging portion 5 provides the welding material for welding the sheets 3 together and therefore should be wide enough to provide sufficient weld material for this purpose. An overhang of about one-eighth of an inch to about one-quarter of an inch has been found sufficient. Any overhanging material 5 in excess of that required to effect a good weld is wasted. Therefore, the overhang should preferably be as small as is commensurate with the obtaining of a good weld.

The sheets 3 are now ready for welding around their edges. This welding is effected by means of a torch 6, preferably such as described in the copending application of High and Harmon, Serial No. 511,660, filed November 25, 1943. The torch 6 is provided with an exhaust port 7 through which flows a hot gas blast 8 having a temperature sufficiently high to heat the thermoplastic material somewhere between its softening point and charring point. The hot gases forming the blast 8 preferably should be inert to the thermoplastic material and can be heated in any desirable manner such as by passing the gas over a hot electrical resistance element or the hot gas can consist of the hot gaseous products of combustion of a combustible gas and air. The torch 6 should also be provided with an ironing tip 9 arranged to be heated to a point somewhere between the softening point and charring point of the thermoplastic material. The ironer 9 can be heated in any suitable manner but preferably is heated as described in the above-mentioned copending application, that is, by the hot gases from torch 6 preparatory to being exhausted from the torch.

The torch is drawn along the templets in the direction indicated by the arrow Fig. 2. The hot gas blast 8 strikes the overhang 5 and melts the same down to form molten thermoplastic weld material which can be designated 10. As this molten weld material is formed by the blast 8, hot ironer 9 slides along the peripheries of the templets 1 and 2 and thereby irons and smooths out the molten weld material to form a smooth, homogeneous weld joint 11 along the periphery of the inner sole. The ironing tip 9 preferably is a segment of a spheroid so that the weld joint 11 which bonds the sheets 3 together is dished slightly inwardly. Any excess weld material is cut off by the coaction of the ironer 9 with the inner edges of the templets 1 and 2 so that the weld joint or seam is smooth and clean.

This manner of welding joins together at the seam joint all of the threads of the several sheets and effectively prevents any loose ends of the threads from sticking up which would act like barbs and provide a very uncomfortable inner sole. This method of welding forms a clean, smooth and homogeneous joint which seals the several plies together along the edge of the inner sole.

Although the above method of welding is useful on all thermoplastic materials, it is particularly useful and commercially well adapted for welding the vinyl resins or thermoplastic polymerized vinyl compounds such, for example, as "Saran B-115," a trade name for a copolymer of vinylidene chloride and vinyl chloride, "Saran F-125," a trade name for a copolymer of vinylidene chloride and vinyl cyanide, "Vinylite," a trade name for a copolymer of vinyl chloride and vinyl acetate, polystyrene (polymerized styrene), polymers of vinyl benzene, polymers of vinyl chloride, polymers of vinyl acetate.

This method of welding permits one to accurately control the temperature to which the thermoplastic material is raised so that the material never reaches its thermal decomposition temperature. Therefore, the joint 11 consists of the same material having the same chemical properties as the thermoplastic material forming the remainder of the inner sole. The physical properties of the material forming the joint are also substantially unchanged and the same as the physical properties of the material forming the remainder of the inner sole.

It is evident from the above description that this method and apparatus is generally useful in the welding of laminated thermoplastic materials, particularly where the laminations are to be joined along their edges.

We claim:

1. The method of welding a plurality of sheets of thermoplastic material along their edges comprising the following steps: placing the sheets with their larger faces in contact, applying a hot gaseous blast to the edges of said sheets to melt the same at a temperature below the thermal decomposition point of the thermoplastic material, and then smoothing off the melted edge portions to form a homogeneous joint along the edges of said sheets.

2. The method of welding a plurality of sheets of thermoplastic material along their edges comprising the following steps: holding the sheets under pressure with their larger faces in contact and their edges substantially in alignment, applying a hot gaseous blast along the edges of said sheets to melt the edges at a temperature below the thermal decomposition point of the thermoplastic, and while in a molten condition ironing the melted edge portions to form a smooth weld joint along the edges of said thermoplastic sheets.

3. The method of welding a plurality of sheets of thermoplastic material along their edges comprising the following steps: placing a plurality of sheets of thermoplastic material between opposed pressure members with the edge portions of the thermoplastic sheets overhanging the edges of the pressure members, applying a hot gaseous blast to the overhanging edges to melt the same, and guiding an instrument along the edge of the pressure members to level off and smooth out the melted edge portion of the thermoplastic sheets to form a weld joint at the edges of the said sheets.

4. The method of fabricating an inner sole for a shoe or the like, comprising placing a plurality of foraminated sheets of thermoplastic material between opposed templets having the contour of the inner sole to be formed with the said sheets overhanging the edges of the templets, applying heat to the overhanging thermoplastic material to melt the same at a temperature below the thermal decomposition point of the thermoplastic, and hot-ironing the melted material to form a weld joint at the edges of the thermoplastic sheets along the periphery of the opposed templets.

5. The method of fabricating an inner sole for a shoe or the like, comprising pressing a plurality of foraminated sheets of thermoplastic material between opposed templets having the contour of the inner sole to be formed with the thermoplastic sheets overhanging the templets along their periphery, applying a hot gaseous blast to the edges of the thermoplastic sheets to melt the same, and then sliding a hot instrument along the peripheries of the templets to level off and smooth the molten thermoplastic material and cut off the excess molten thermoplastic material to form a smooth weld joint.

6. The method of fabricating an inner sole for a shoe or the like, comprising placing a plurality of sheets of thermoplastic material woven from thermoplastic threads between opposed templets having the contour of the inner sole to be formed with the said sheets overhanging the edges of the templets, applying a hot gaseous blast to the overhanging thermoplastic material to melt the same at a temperature below the thermal decomposition point of the thermoplastic, and hot-ironing the melted material to form a weld joint at the edges of the thermoplastic sheets along the periphery of the opposed templets.

7. Apparatus for welding a plurality of sheets of thermoplastic material together comprising opposed dies for holding a plurality of thermoplastic sheets therebetween with the edges of said sheets overhanging the edges of said dies, a hot instrument adapted to travel along the edge of the dies, and applying heat to the overhanging edges of thermoplastic material to melt the same at a temperature less than the decomposition temperature of the thermoplastic material, and an ironer adapted to be heated for following the said instrument and sliding along the edges of said dies to level off and smooth out the melted edge portion of said thermoplastic sheets and cut off any excess melted thermoplastic material whereby a smooth weld joint is formed along the edge of the dies.

8. Apparatus for welding a plurality of sheets of thermoplastic material together comprising opposed dies for holding a plurality of thermoplastic sheets therebetween with the edges of said sheets overhanging the edges of said dies, a torch adapted to travel along the edge of the dies, and applying a hot gaseous blast against the overhanging edges of thermoplastic material to melt the same at a temperature less than the decomposition temperature of the thermoplastic material, and an ironer in heat exchange relation with said hot gases adapted to follow said torch and ride along the edges of said dies to iron the melted edge of said thermoplastic sheets to form a smooth weld joint along the edges of said sheets.

9. Apparatus for welding a plurality of sheets of thermoplastic material together, comprising opposed dies for holding a plurality of thermoplastic sheets therebetween under pressure with the sheets in flat condition and with the edges of the sheets overhanging the edges of said dies, and a combined torch and ironer adapted to travel along the edge of the dies to apply a hot gaseous blast against the overhanging edges of the thermoplastic material and with the ironer following the hot gaseous blast and cooperating with the edges of said dies to iron the melted edge portions of said thermoplastic sheets and form a smooth weld along the edge of the thermoplastic sheets.

10. Apparatus for welding a plurality of sheets of thermoplastic material together, comprising opposed dies for holding a plurality of thermoplastic sheets therebetween with the edges of said dies coinciding and with the edges of said sheets overhanging the edges of the dies, a torch adapted to apply a hot gaseous blast against the overhanging edges of thermoplastic material to melt the same, and a hot ironer adapted to follow said torch and slide along the edges of said dies to level off and smooth out the molten material to form a weld joint along the edges of the thermoplastic sheet.

11. Apparatus for forming an inner sole for a shoe or the like, comprising opposed templets having a periphery corresponding to the periphery of the inner sole to be formed, means for clamping the templets against opposite faces of a plurality of sheets of thermoplastic material, and a torch and ironer adapted to travel together with the torch preceding the ironer about the edge of the templets, the torch applying a hot gaseous blast against the edges of the thermoplastic material to melt the same at a temperature below the decomposition temperature of the thermoplastic material and the ironer serving to level off and smooth out the molten material whereby a smooth weld joint is formed at the edges of the thermoplastic sheets.

LE ROY B. HIGH.
GUNNAR C. T. LINDH.